No. 796,648. PATENTED AUG. 8, 1905.
C. A. HIRTH.
CAGE FOR BALL BEARINGS.
APPLICATION FILED JULY 20, 1904.

Witnesses
Henrietta Lyon
A. L. Reichel

Inventor
Carl Albert Hirth
by Redding, Kiddle & Greeley
Attys

UNITED STATES PATENT OFFICE.

CARL ALBERT HIRTH, OF CANNSTATT, GERMANY, ASSIGNOR TO ERNST GUSTAV HOFFMANN, OF DREISKAU, NEAR LEIPSIC, GERMANY.

CAGE FOR BALL-BEARINGS.

No. 796,648.        Specification of Letters Patent.        Patented Aug. 8, 1905.

Application filed July 20, 1904. Serial No. 217,313.

*To all whom it may concern:*

Be it known that I, CARL ALBERT HIRTH, engineer, a subject of the German Emperor, and a resident of Pragstrasse, Cannstatt, in the Empire of Germany, have invented a certain new and useful Improvement in Cages for Ball-Bearings, of which the following is an exact, full, and clear description.

This invention relates to an improved construction of cages for holding the balls in two-point ball-bearings; and its object is to minimize the friction in such ball-bearings.

In the cages hitherto constructed it has been found out that the friction was frequently increased by the fact that the walls of the cage come in contact with and rub against the peripheral zones of the balls where the greatest circumferential velocity takes place. This drawback is obviated by the hereinafter-described construction of the cage. Furthermore, in the construction according to the invention provision has been made whereby the noisy action of the ball-bearing is obviated, this action being generally caused by the fact that the balls change their position owing to vibrations and shocks, thus striking irregularly against each other or against the sides of the cage.

Figure 1:
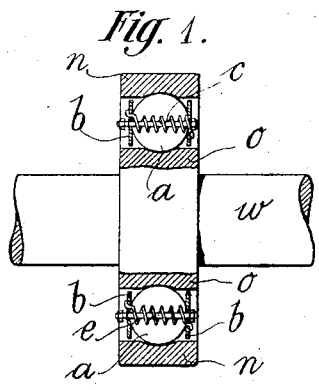
Figure 3:
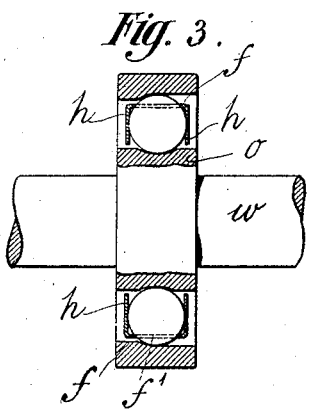
Figure 4:
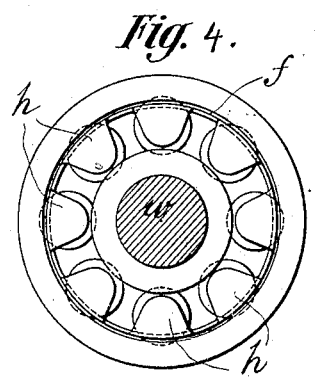
Figure 7:
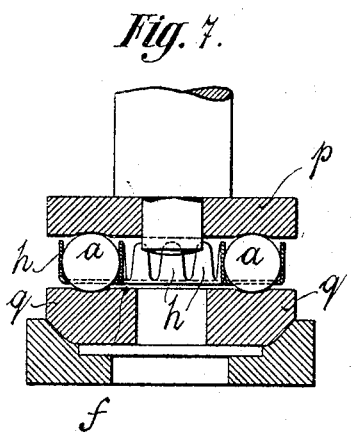
Figure 2:
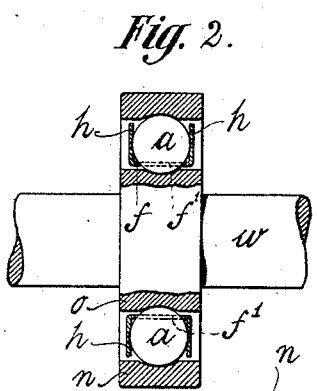
Figure 8:
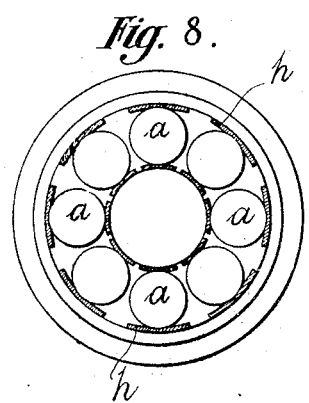
Figure 10:
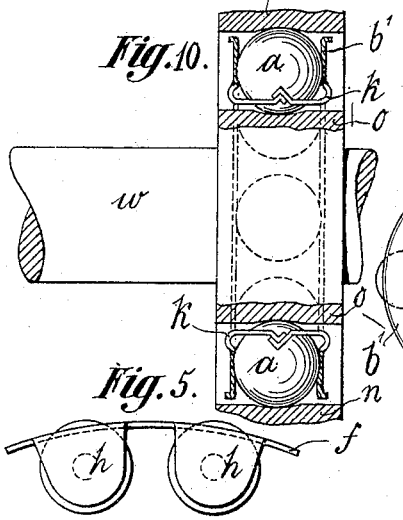
Figure 5:
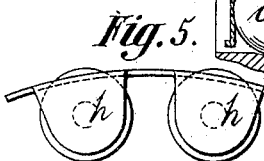
Figure 9:
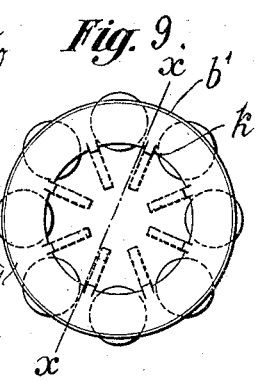
Figure 6:
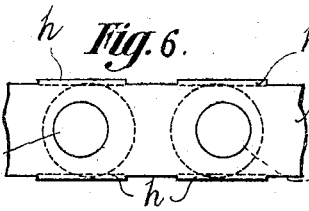

Reverting to the accompanying drawings, Figures 1 and 2 are elevations of an ordinary two-point ball-bearing provided with the improved cage in two forms of constructions, the cone and cup portions being shown in section. Fig. 3 is a similar view of a two-point ball-bearing, showing a modified construction of the cage as compared with Fig. 2 and having its cup portion shaped with a cylindrical interior. Fig. 4 is a side elevation of Fig. 3. Fig. 5 shows in side elevation, on an enlarged scale, a portion of the cage-frame according to Figs. 3 and 4 for illustrating the arrangement of the lateral spring-lugs. Fig. 6 is a plan of Fig. 5. Fig. 7 shows a thrust-bearing constructed with a cage of the improved type. Fig. 8 is a plan of the uncovered thrust-bearing according to Fig. 7, the lugs of the cage being shown in section. Fig. 9 shows a modified form of the cage for journal-bearings similar to Fig. 1, comprising a pair of plates provided with interlocking arms. Fig. 10 is a section, on an enlarged scale, on the line $x\ x$ of Fig. 9.

According to my invention I provide cages which are capable of keeping the balls between spring-supported walls. The balls are arranged so as to touch these walls only with their pole-surfaces—*i. e.*, where there is the least friction. In order that the balls may not change their positions, they are positively held by the contacting parts of the cage, which are suitably recessed for partly engaging the pole-surfaces of the balls. It is not necessary to curve the recesses concentrically to the surface of the ball; but instead of a spherical contact a linear contact may be employed. According to this general arrangement the cage, with its lateral walls, prevents the balls from getting out of their proper positions, while the pole ends practically serve as pivots for the balls in their rolling movements. Nevertheless they do not materially interfere with the free rotation of the balls, which are capable of adjustment in any direction.

In Fig. 1 the balls $a$ are arranged between the inner or cone portion $o$ and the outer cup portion $n$, each portion being provided with a groove forming the race for the balls. The cone portion is fixed to the shaft $w$. The cage-frame in this case is formed of two annular plates $b\ b$, which hold and guide the balls interposed between them and are subjected to spring-pressure for the purpose of gripping the balls. Bolts $c$ may serve for loosely connecting the annular plates $b\ b$, provision being made for permitting a sliding movement of the annular plates in the direction of the bolts $c$. The spring action by which the annular plates $b\ b$ are drawn together is exerted by suitable springs—for instance, by coiled springs $e$, mounted on the bolts $c$ and having their ends attached to the plates. The tension of the springs must only be just sufficient for a light grip of the balls, so that the latter are not impeded in their free movements and can revolve no matter what diameter may form the axis of revolution. It is essential that the plates $b\ b$, where they contact with the pole-surfaces of the balls, are recessed or provided with shallow cavities, so as to fit more or less snugly onto the spherical surface. The said coiled springs $e$ may be replaced by suitably-arranged flat springs tending to lightly press the plates $b\ b$ together.

In Figs. 2 and 3 modified constructions of the cage are illustrated, according to which the cage-frame is formed with elastic lugs gripping the balls and serving as springs. The said lugs are lettered $h$ and extend from the cage-frame $f$ proper, which is formed in the construction according to Fig. 2 by an inner ring and in the case of Fig. 3 by an outer ring. This ring or cage frame $f$ (shown in side elevation in Fig. 4) is provided with apertures at $f'$, through which the balls protrude without coming in contact with the edges of the apertures. The cage-frame $f$, with the lugs $h$, can be made from a hoop or collar, and the lugs formed thereon are bent at right angles, so as to be located opposite each other. This construction is shown in Fig. 4 and in detail in Figs. 5 and 6. It can be seen from the latter figures that the pole-surface of the balls are seated in small cavities on the inner faces of the lugs, and thus form pivots for the balls.

A similar construction of the cage applies to the arrangement of a thrust-bearing shown in Figs. 7 and 8. In this case the balls are disposed in a horizontal row between an upper thrust-ring $p$ and a lower abutment $q$. The balls are held in a cage formed by an annular frame $f$, having upright spring-lugs $h$. The lugs are disposed in pairs radially and face each other, cavities being provided for receiving the balls. The cage of this type may be formed of sheet metal, the blank comprising the lugs to be bent at right angles.

In some cases the cage of the improved type is formed of two parts. Each of these parts is provided with arms which interlock each other where the ends are of angular form for the gripping engagement. This interlocking arrangement is shown in Figs. 9 and 10 as applied to a cage for a two-point journal bearing. In this instance each side plate $b'$ has inwardly-projecting arms $k$, which interlock in the way as shown in Fig. 10. It is obvious that the plates of this cage after inserting the balls can be brought together by lateral pressure until the interlocking arms or tongues $k$ slip into engagement. The spring action produced by suitably bending the arms $k$ is sufficient to afford a yielding support of the plates against the pole-surfaces of the balls.

The improved cage herein described permits a secure holding and guiding of the balls, while avoiding any considerable friction and not interfering with the free movement of the balls.

Having now particularly described and ascertained the nature of my said invention and in what manner the same is to be performed, I declare that what I claim, and wish to secure by Letters Patent, is—

1. In combination with a two-point ball-bearing, a cage-frame formed of two parts, springs connecting these parts, cavities provided on the latter and adapted to take hold of the balls at their axes of rotation substantially as described.

2. In a ball-bearing, a cage composed of a ring-like holding-frame and means for yieldingly gripping the balls.

3. In a ball-bearing, a cage composed of a ring-like holding-frame and means for yieldingly guiding the balls.

4. In a ball-bearing, a cage composed of a ring-like holding-frame and means for yieldingly gripping and guiding the balls.

5. In a two-point ball-bearing, a cage composed of a ring-like holding-frame and means for yieldingly gripping the balls at their axes of rotation respectively.

6. In a two-point ball-bearing, a cage composed of a ring-like holding-frame and means for yieldingly gripping the balls at their axes of rotation respectively, the balls being seated in cavities in said frame.

In witness whereof I have hereunto set my hand in presence of two witnesses.

CARL ALBERT HIRTH.

Witnesses:
  ERNST ENTENMAN,
  WM. HAHN.